United States Patent [19]

Breil et al.

[11] Patent Number: 5,749,131
[45] Date of Patent: May 12, 1998

[54] TRANSPORT DEVICE FOR A CONTINUOUS MOVING SHEET, IN PARTICULAR STRETCHING DEVICE FOR A PLASTIC FILM WEBS

[75] Inventors: Jürgen Breil, Grabenstätt; Manfred Steffl, Grassau, both of Germany

[73] Assignee: Bruckner Maschinenbau GmbH, Siegsdorf, Germany

[21] Appl. No.: 737,827

[22] PCT Filed: Mar. 14, 1996

[86] PCT No.: PCT/EP96/01113

§ 371 Date: Nov. 20, 1996

§ 102(e) Date: Nov. 20, 1996

[87] PCT Pub. No.: WO96/29190

PCT Pub. Date: Sep. 26, 1996

[30] Foreign Application Priority Data

Mar. 21, 1995 [DE] Germany ............ 195 10 281.9

[51] Int. Cl.$^6$ .................................... D06C 3/04
[52] U.S. Cl. ...................................... 26/89; 26/93
[58] Field of Search ................. 26/73, 72, 89, 26/93, 71, 92, 96, 88, 84; 271/190, 198, 202; 198/619, 620, 622, 626.1, 793, 794, 833

[56] References Cited

U.S. PATENT DOCUMENTS 3,391,421 7/1968 D'Onofrio et al. .................. 26/73
3,500,515 3/1970 Cunningham et al. .
4,706,348 11/1987 Gresens .............................. 26/79
5,072,493 12/1991 Hommes et al. .
5,081,750 1/1992 Molz ................................... 26/73
5,367,753 11/1994 Mueller .............................. 26/73
5,390,398 2/1995 Rutz et al. .......................... 26/72

FOREIGN PATENT DOCUMENTS

| 2147876 | 8/1971 | France . |
| 2317076 | 7/1975 | France . |
| 3333938 | 9/1983 | Germany . |
| 3339150 | 10/1983 | Germany . |
| 3741582 | 12/1987 | Germany . |
| 4006440 | 3/1990 | Germany . |

OTHER PUBLICATIONS

Database WP1 Section Ch, Derwent Publications Ltd., Class A32, AN-73-72307U XP002005726 & JP.B.48 038 779 (Japan Steel Work Ltd).

Primary Examiner—Amy B. Vanatta
Attorney, Agent, or Firm—Nixon & Vanderhye

[57] ABSTRACT

An improved transport device for a moving material web, in particular a stretching system for plastic film webs which is in particular suitable for high circulating speeds, is distinguished by the fact that a guide rail system (3) comprising at least one guide rail (3', 3") and along which tenter elements (1) can be moved by means of a linear motor drive (5), is integrally incorporated in the relevant linear motor (5', 5"). The respective tenter element (1) is supported with respect to the guide rail system (3) by means of a sliding bearing or a combined sliding and roller bearing.

16 Claims, 5 Drawing Sheets

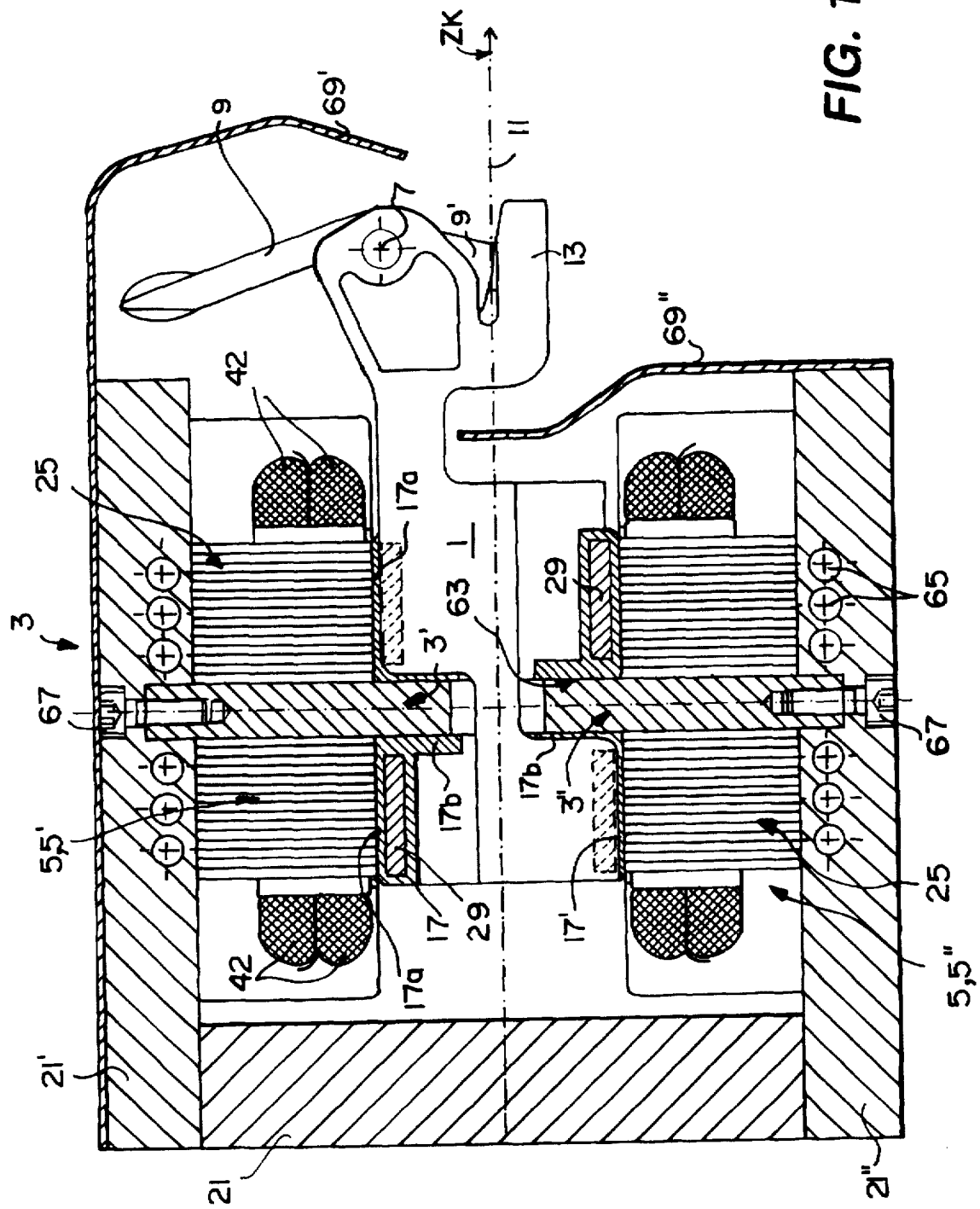

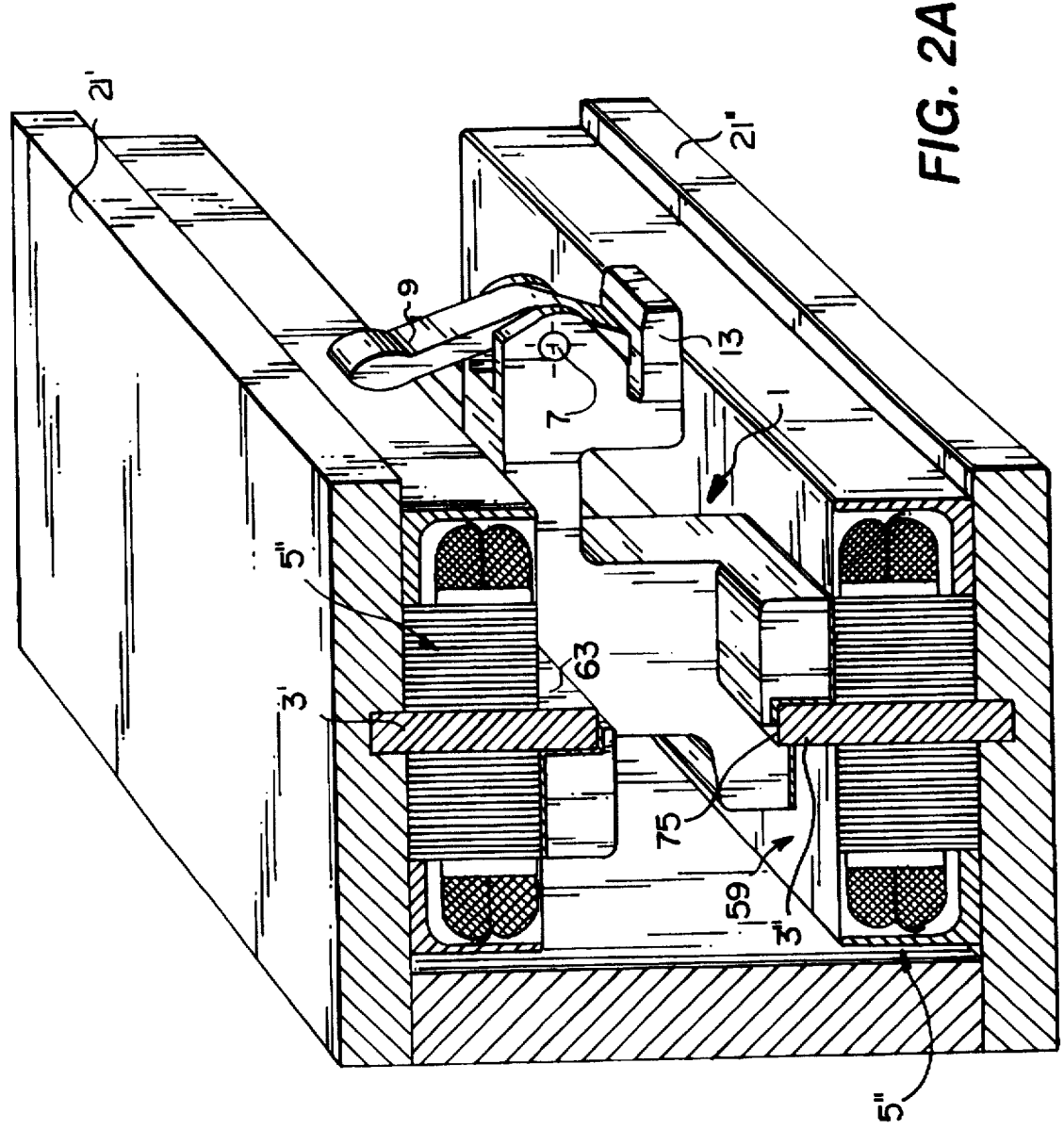

TRANSPORT DEVICE FOR A CONTINUOUS MOVING SHEET, IN PARTICULAR STRETCHING DEVICE FOR A PLASTIC FILM WEBS

The invention relates to a transport device for material webs, in particular a stretching system for plastic film webs.

Devices for stretching a moving material web are employed in particular in the production of plastic films.

In the production of plastic films, both transverse stretching systems, longitudinal stretching systems and also simultaneous stretching systems are known, in which the material web, that is to say the plastic film web, is simultaneously subjected to longitudinal and transverse stretching.

For this purpose, so-called tenters or tenter carriages are used, which are moved along a guide device, generally a guide rail.

A device for the simultaneous biaxial stretching of a moving material web, in particular a plastic web, has been disclosed, for example, by DE 37 41 582 C2. In this case, a multiplicity of tenters or tenter carriages run along guide rails on both sides of the material web to be treated, and are connected to one another by means of chain scissor-jacks. By means of the specific separate guidance of the chain jacks, in this case the spacing of the individual tenter carriages can be deliberately increased in the stretching zone, so that the longitudinal and transverse stretch ratio can be adjusted thereby. As is known, there are provided on the tenter carriages clamping devices by means of which the edge of the material web to be treated can be gripped and moved on.

A device for the transverse stretching and fixing of film webs has been disclosed, for example, by DE 40 06 440 C2, in which device the individual chain carriages or tenter carriages are moved on by means of a circulating transport chain, the spacing between the individual tenter carriages remaining essentially unchanged.

Even though it is known from DE 33 33 938 A1 to support the tenter chain, for example, via three sliding guides which are stationary and located offset with respect to one another, and DE 33 39 150 A1 also discloses providing the tenter chain described therein with a detachable sliding piece, in practice, however, corresponding transport devices with tenter carriages have become widespread, said carriages being guided via a plurality of rollers which are seated at intervals in the longitudinal direction of the guide web on the tenter carriage and support the tenter carriage in the vertical and horizontal direction.

In order to increase the production capacity, web speeds are also continuously increasing. Web speeds of more than 300 m/min are not infrequent. In particular also in relation to the non-negligible mass of the individual tenter carriages, the loading on the rollers and bearings and on the guide rails is also naturally increasing.

Thus, for example for simultaneous stretching systems according to U.S. Pat. No. 5,072,493, inter alia also to increase the web speeds and to minimize the susceptibility to faults, it is proposed to drive a tenter carriage, which can likewise be moved along a guide rail by means of running rollers, by means of a linear motor. This opens up the possibility that in principle the tenter carriages can be driven and accelerated individually and that, for example, differing from the simultaneous stretching system according to DE 37 41 582 C2, the chain jacks connecting the individual tenter carriages can be dispensed with.

Nevertheless, with the increasing transport and web speeds of the advancing web and hence of the tenter carriages, the forces arising on the tenter carriage are increasing in such a way that, on account of the loadings occurring, and in particular also the bearing loadings, the lifetime of the overall transport system is restricted and repairs are frequently necessary because of failures.

In the case of the simultaneous stretching system previously known from U.S. Pat. No. 5,072,493, the chains connecting the individual tenter carriages and stabilizing the latter in the vertical direction are also dispensed with, since the tenter elements are moved on the guide system independently of one another. In this case, particularly high requirements in relation to the guiding accuracy are placed on the roller system and the roller bearings. In particular at web speeds of above 300 m/min, this requires extremely high manufacturing tolerances, which naturally contributes to a considerable increase in costs. However, the maintenance of high manufacturing tolerances itself leads to a comparatively limited lifetime of the roller rails and running rollers and/or to a distinct restriction of the maximum permissible speed, in order to reduce the loading. On the one hand, this is caused by the high surface pressure during roll contact and, on the other hand, by the limits on the bearing life, which is shortened by failure mechanisms of the tribological system at the high speeds of revolution occurring, by bearing forces and temperatures.

It is the object of the present invention, therefore, proceeding from the last-mentioned prior art, to provide an improved transport device for a moving material web, in particular a stretching system for plastic film webs, which in particular makes high circulating speeds possible at comparatively low loadings for the tenter carriages.

The object is achieved, according to the invention, in accordance with the features specified in claim 1. Advantageous refinements of the invention are specified in the subclaims.

A plurality of decisive advantages may be realized with the present invention.

The device according to the invention, in particular for a simultaneous stretching system, comprises tenter elements which are driven along a guide system using linear motors. According to the invention, provision is in this case made to employ a guide rail or a guide rail section (so-called dual rail) in or on the linear motor, as a result of which a particularly favorable distribution of the forces onto the guide device is made possible. Furthermore, as a result of this arrangement, a low constructional height of the transport system is ensured, for which reason the air stream needed for heating in the case of stretching plastic film webs can be led closer to the film. The overall result is a shortened construction of the system and thus, above all, lower investment costs.

According to the invention, provision is made in this case for the tenter elements to be movably supported at least partly by means of a sliding bearing on the guide rail system. In a preferred embodiment, the bearing is carried out exclusively by means of a sliding bearing. In particular as a result of the optimum distribution of the forces with regard to the configuration and arrangement, according to the invention, of the guide rail integrated on or in the linear motor drive, a particularly optimum distribution of the forces results from the use of the sliding bearing. This allows the lifetime as a whole to be distinctly increased and the risks of failure for tenter arrangements of this type to be reduced. For the operator of a system, this means a higher output capacity with lower stoppage times.

In a particularly preferred embodiment, provision is made for the one or more sliding elements to be supported in a sliding manner either not at all or not only on the actual guide rail section, but that the active surface and housing wall of the linear motor itself (or a covering wall protecting the linear motor) serves as sliding surface. In a development of the invention, it is in this case possible to fill the air gap formed between the linear motor and the magnet (permanent magnet) provided on the tenter element with the material of the sliding element.

In particular, the supporting forces acting at 90° transversely to the sliding surface designed on the linear motor can be supported on that separate guide rail section projecting beyond the linear motor, a sliding bearing or else even a separate roller bearing also preferably being possible here.

Further advantages, details and features of the invention emerge below from the exemplary embodiments represented using drawings. In the drawings, in detail:

FIG. 1 shows a schematic cross-sectional representation at right angles to the longitudinal direction of a guide rail and of a tenter carriage which can be moved along on the latter and driven by means of a linear motor;

FIG. 2a shows a schematic sectional perspective representation of a tenter element retained on the guide rail system;

FIG. 2b shows a corresponding perspective representation of the tenter element shown in FIG. 2a;

Figure 2B:
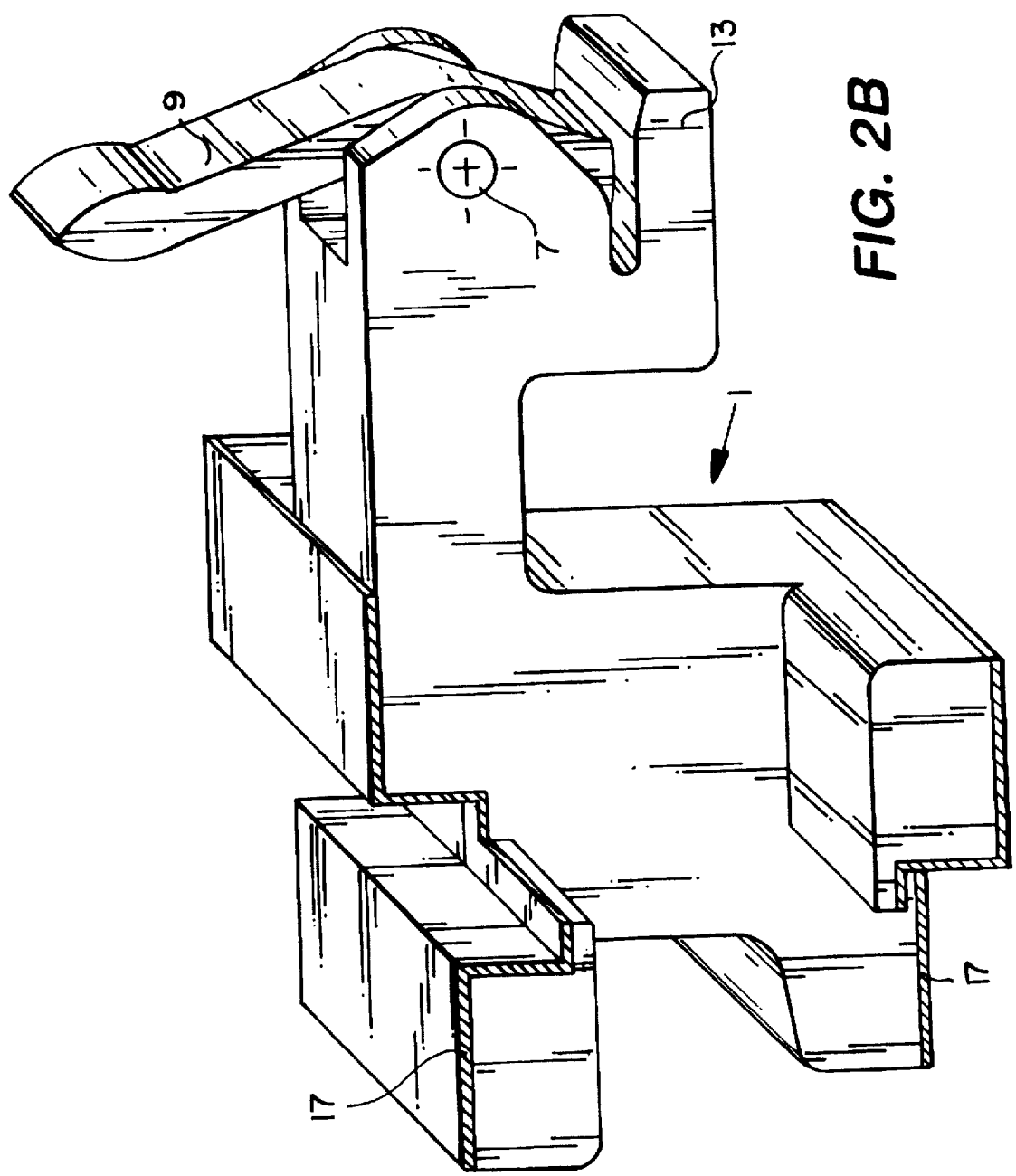

Shown in FIG. 1, in schematic front view, is a tenter element 1 which can be moved along a guide rail system 3—that is to say at right angles to the drawing plane—by means of a linear motor drive 5.

The tenter element 1 comprises a clamping lever or tenter lever 9 which can be pivoted about a pivot axis 7.

Along the chain-dotted material web plane 11, a material web, in the case of plastic film production a plastic film web to be stretched, is retained clamped at the edge between the lower clamping point 9' of the tenter lever 9 and the so-called tenter table 13 during the onward movement of the material web and in particular during the stretching process. As a result, along the direction represented by the arrow, forces are introduced onto the tenter element 1 via the material web. On the opposite side of the material web, a corresponding tenter arrangement runs symmetrically on a further guide rail system.

The guide rail system 3 comprises an upper guide rail 3' and a lower guide rail 3", which in the exemplary embodiment shown according to FIG. 1 lie above one another in a common guide rail plane, which is aligned at right angles to the material web plane 11 and hence at right angles to the material web tensile forces ZK.

The two guide rails 3' and 3" are part of a guide rail carrier 21 which is C-shaped in cross section. The upper and lower guide rail carrier section 21' and 21" serve at the same time as motor mounting for the linear motors 5. The upper and lower linear motor 5' and 5" comprise a laminated core 25 having a multiplicity of ferromagnetic metal sheets (iron), which are electrically insulated from one another, for example by applying an insulating layer, to avoid or reduce eddy current effects.

Figures 3, 4:
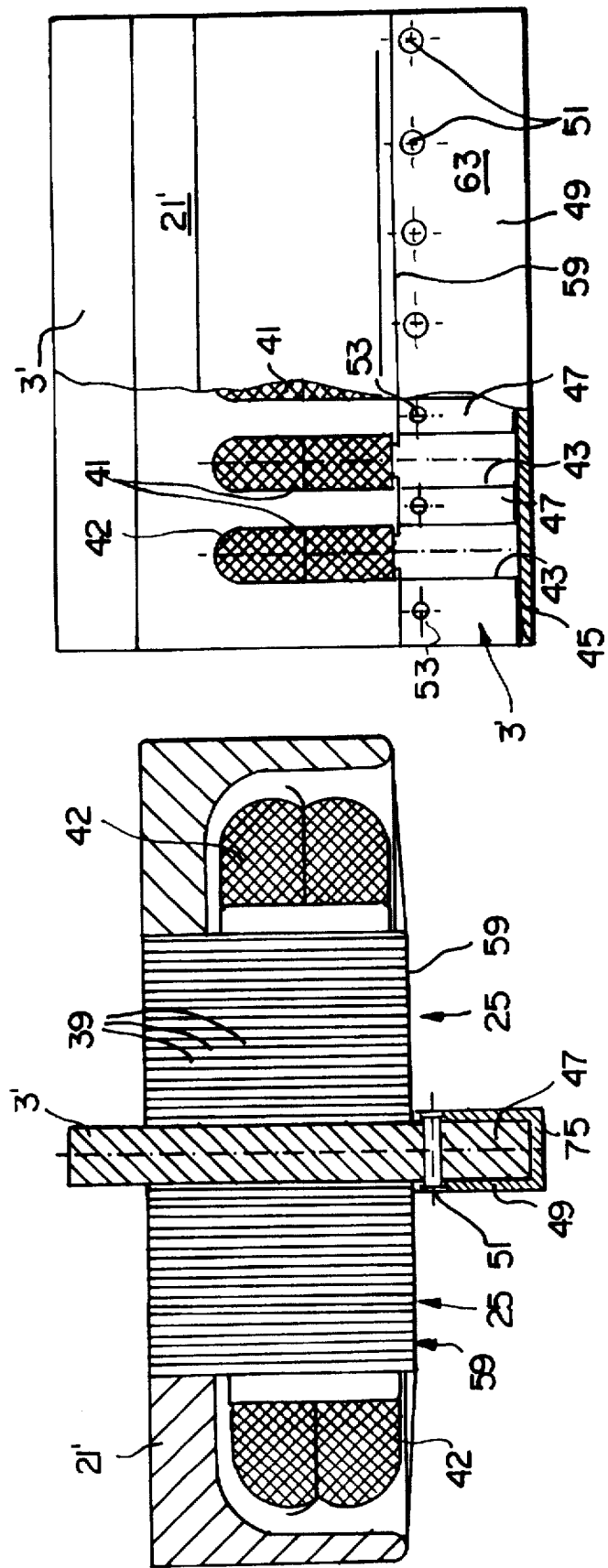
FIG. 3 shows an enlarged schematic detailed representation of the linear motor shown at the top in FIG. 1.
FIG. 4 shows a schematic side view, partially in section, of the linear motor with the integrated guide rail.

As emerges from the schematic cross-sectional representation according to FIGS. 3 and 4, cutouts 41 are made at intervals in the longitudinal direction in the ferromagnetic metal sheets 39, which are located congruently one on the other, opposite the guide rail carrier sections 21' and 21" serving as motor mounting, into which cutouts a multiplicity of individual wires which form the winding heads 42 are laid.

Incorporated integrally in the center of the respective linear motor 5, 5", that is to say in the center of the respective laminated core 25, is the associated guide rail 3' or 3" of the rail arrangement 3, which is designed as a dual rail.

From the side representation according to FIG. 4, it can also be seen that the relevant upper or lower guide rail 3', 3" is provided with a multiplicity of cutouts 43. These cutouts 43 are made into the guide rails 3', 3" from the free edge 45 (which faces the tenter element), the cutouts 43 being made transversely to the material web and at the same time to coincide with the cutouts 41 in the metal sheets 39. Hence, corresponding finger-shaped sections 47 project beyond the lower edge of the laminated core. This arrangement offers a relatively simple possibility to produce the winding heads 42 by inserting the winding wires into the relevant cutouts. To achieve a continuous running rail, the respective U-shaped running rail profile 49, which is shown in FIGS. 3 and 4, is then plugged over the finger-shaped sections 47 and secured, for example using rivets 51 which pass through the holes 53 made in the finger-shaped sections 47.

The height of the running rail profile 49 is selected such that it reaches as far as the wall surface which bounds the laminated core 25 and serves as the sliding surface 59 in the exemplary embodiment shown.

As specifically can be seen from FIG. 1, use is made in the sectional representation according to FIG. 1 of essentially angular sliding elements 17 which, on the one hand, rest with one sliding element limb 17a on the sliding surface 59 bounding the linear motor and, on the other hand, rest with their sliding element limb 17b, aligned at right angles thereto, on the relevant lateral bearing surface 63 of the guide rails 3', 3", said surface being formed by the side wall of the running surface profile 49 covering the guide rail. However, the sliding elements 17 can also be designed such that, in addition to or as an alternative to being supported on the sliding surface 59 on the laminated core 25 of the linear motors, they are supported on the downwardly aligned or upwardly aligned (that is to say aligned transversely to the material web) guide rail edge.

The sliding elements 17 mentioned are retained and fastened on the tenter element 1 by suitable means (for example by means of a positive connection, however, as an alternative or in addition thereto, a non-positive anchoring of the sliding element 17 is also possible, for example by using an adhesive or vulcanization technique).

As can only be inferred from FIG. 1 and FIGS. 2a and 2b, the sliding elements 17 or individual sliding element sections may as a rule have shorter dimensions in relation to the length of the tenter element 1 running parallel to the guide rail 3. This makes it possible for a plurality of sliding elements or sliding element sections to be designed on the respective tenter element, located offset in its longitudinal direction.

As can also be seen from the representation of FIGS. 2a and 2b, because of the geometry of the tenter element, the sliding elements 17 or sliding element sections 17 in each case opposite the relevant guide rail 3' or 3" are located offset in the longitudinal direction of the guide rail, in order to ensure the most optimum guide interval of the tenter carriage 1 in relation to the guide rail.

As further emerges in particular from FIG. 1, the magnets 29 which are seated on the tenter element, that is to say the permanent magnets 29, are in each case cast into the relevant limbs 17a of the sliding elements 17. In other words, by this means the air gap formed between the magnets 29 and the adjacent wall surface of the laminated cores 25 of the linear motors 5', 5" is bridged over by the material of the sliding element 17. In this way, a predefined spacing can also be maintained optimally between the permanent magnets 29 and the relevant sliding surface 59 on the linear motor.

It also emerges from the structure explained that the guide rail system 3 for supporting the respective tenter element 1 comprises not only the centrally arranged two guide rails 3' and 3", but at the same time also the laminated cores 25, that is to say in other words the linear motors themselves. This is because the sliding elements are supported directly on the linear motors in the direction at right angles to the material web of the plastic film to be stretched and on the corresponding side walls of the guide rails 3' and 3" in the direction parallel to the material web.

Merely for the sake of completeness, it should further be mentioned that cooling bores 65, through which coolant flows, are made in the upper and lower guide rail carriers 21', 21" serving as motor mounting. Located in between said cooling bores, the rear longitudinal side of the guide rail is detachably anchored by means of screws 67 in a corresponding U-shaped cutout. At the same time, on the side of the tenters, a further upper and lower shield 69' and 69" are provided, the upper shield 69' covering the tenter lever 9 on the material web side and extending approximately as far as the level of the pivot axis 7 of the tenter lever 9, whereas the lower shield 69" is arranged to the rear of the tenter table and extends approximately as far as a level which preferably lies above the clamping plane 11 of the material web.

Figure 5:
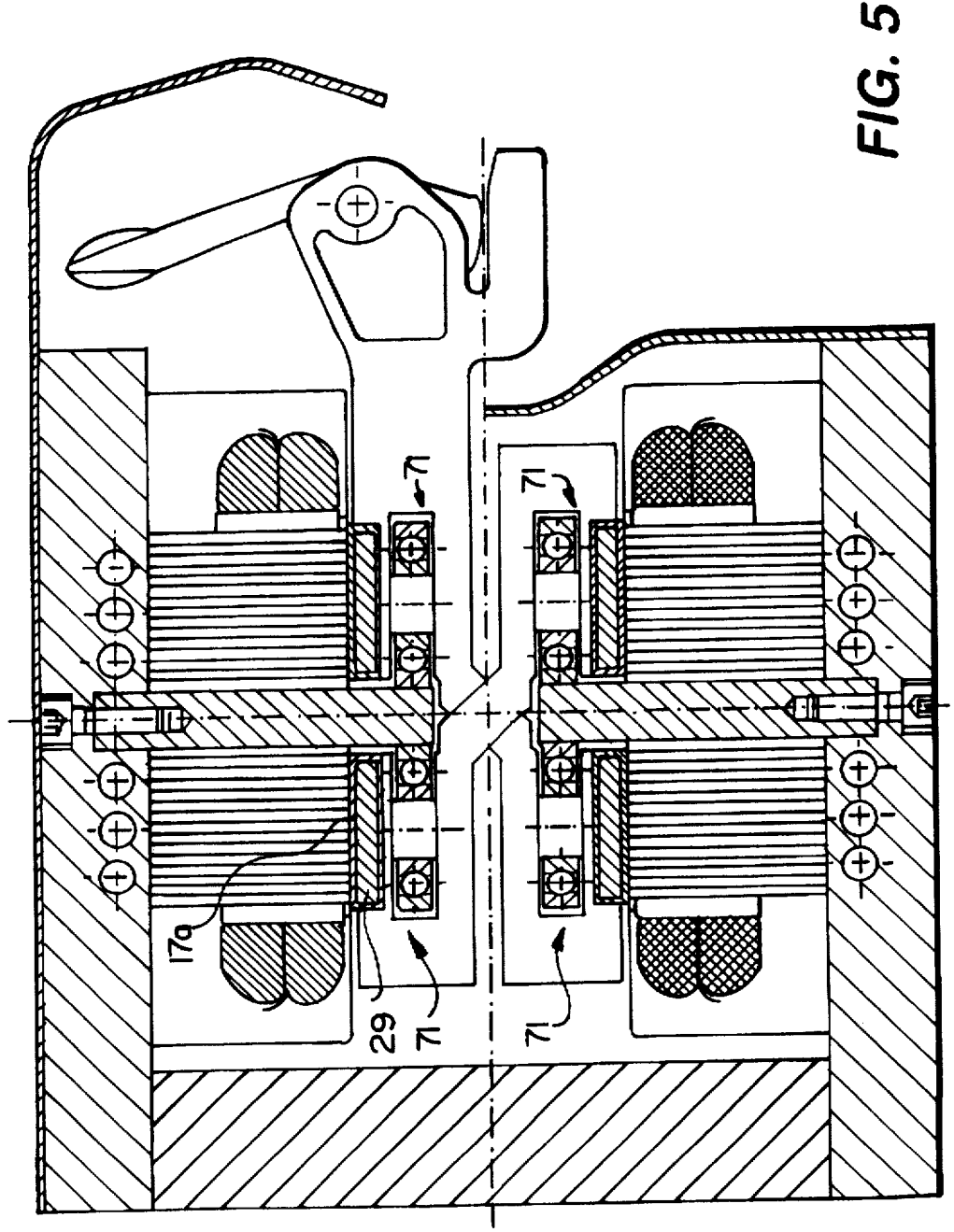
FIG. 5 shows a cross-sectional representation, modified from FIG. 1, of a further exemplary embodiment.

The exemplary embodiment according to FIG. 5 differs from the exemplary embodiment according to FIG. 1 in that the sliding bearing is effective only in the vertical direction opposite the sliding surfaces 59 on the linear motor side, and the support acting essentially in the direction parallel to the material web is carried out via running rollers 71 which are supported on the two opposite side surfaces or bearing surfaces 63 on the respective guide rail 3', 3".

This embodiment offers advantages, in particular in the case of stretching relatively thick plastic films or such materials which require higher specific stretching forces, such as polyamide, greater forces for the sliding bearings being produced in particular in the last-mentioned case. Additional bearing forces are produced, in particular by the lever arm formed between the centre line of the guide system and the film clamping device. According to the exemplary embodiment according to FIG. 5, these additional bearing forces are supported via the said running rollers 71, whereas the vertical forces, which are produced by the attraction forces of the permanent magnets 29 needed for the linear drive, are largely balanced out and supported via the large-area sliding bearing.

Finally, but also deviating from the exemplary embodiment according to FIG. 1, sliding elements 17 or sliding element sections can be used which are supported not only on the side surfaces in the direction parallel to the material web but, furthermore, also on the end, horizontally directed side wall 75 (FIG. 3) of the guide rail section 3', 3". Hence, the corresponding support in the vertical direction on the laminated cores 25 of the linear motors could be left out. The air gap mentioned between the permanent magnet 29 and the adjacent wall of the laminated cores 25 would then remain.

The sliding elements or sliding element sections 17 can in this case be configured to be U-shaped in the cross-sectional representation corresponding to FIG. 1, and engage over the running surface profile 49 mentioned. Likewise, use can also be made not of U-shaped but in each case angular sliding sections which are supported in each case on the side wall 75 of the guide rail sections 3', 3" and in each case on the one bearing surface 63 or the opposite bearing surface 63 of the running rail profile 49 and in this arrangement are located offset in the longitudinal direction of the tenter carriage.

We claim:

1. A transport device for a moving material web comprising:

a guide rail system having a first guide rail;

a tenter element for clamping and retaining the moving material web and supported by said first guide rail;

a linear motor drive including a first linear motor;

said first guide rail being integrally incorporated in said first linear motor; and a sliding bearing carried by said guide rail system between said tenter element and said first guide rail for enabling sliding movement of said tenter along said guide rail.

2. A device according to claim 1 wherein said linear motor drive comprises a second linear motor with said first and second linear motors constituting upper and lower motors, respectively, along said guide rail system; a second guide rail, said first and second guide rails constituting upper and lower guide rails, respectively; said guide rails being located at intervals substantially transverse to the material web; a sliding bearing between each said tenter element and said second guide rail, said tenter elements being slidably supported between said upper and lower linear motors and for sliding movement along said upper and lower guide rails.

3. A device according to claim 2 wherein said first and second guide rails are integrally incorporated in the center of said first and second linear motors, respectively.

4. A device according to claim 2 wherein each said first and second guide rails projects beyond said first and second linear motors, respectively, in the direction of said tenter elements between said guide rails.

5. A device according to claim 2 wherein said sliding bearings include sliding surfaces formed on the respective linear motors.

6. A device according to claim 1 wherein said sliding bearing includes a sliding element carried by said tenter element and aligned generally parallel to the material web and a sliding surface carried by said linear motor, said sliding element being supported by said sliding surface of said linear motor, said sliding element including a first sliding member bearing against said sliding surface.

7. A device according to claim 6 including a permanent magnet carried by said tenter element, said sliding element being disposed between said magnet and said sliding surface.

8. A device according to claim 7 wherein said sliding element has a pocket and encloses said permanent magnet therein.

9. A device according to claim 6 wherein said sliding element includes a second sliding member located at substantially right angles to said first sliding member and bearing against an adjacent side bearing surface of said guide rail.

10. A device according to claim 2 wherein said tenter element is supported on edges of said guide rails located in spaced opposition to one another.

11. A device according to claim 1 wherein said tenter element is supported and retained in a direction transverse to the material web by said sliding bearing and in a direction parallel to the plane of the material web by roller bearings, said roller bearings having running rollers supported on lateral bearing surfaces of said guide rail projecting beyond said linear motor.

12. A device according to claim 6 wherein said sliding element is discontinuous along the length of said tenter element in the longitudinal direction of material travel and lies along leading and trailing ends of said tenter elements.

13. A device according to claim 1 wherein said linear motor comprises a multiplicity of metal sheets having cutouts opening toward the tenters, said guide rail being arranged centrally in the laminated core formed from metal sheets and having cutouts substantially in registration with cutouts in said metal sheets.

14. A device according to claim 13 including a running surface profile on a section of said guide rail projecting beyond said linear motor and said profile being fastened to said guide rail section.

15. A device according to claim 1 including a roller bearing carried by said guide rail system between said tenter element and said first guide rail to enable combined rolling and sliding movement of said tenter along said guide rail.

16. A device according to claim 1 wherein said tenter element includes sliding elements, said sliding elements being longitudinally offset from one another in a direction of movement of the moving material web.

* * * * *